United States Patent

Pätzold et al.

[11] Patent Number: 5,809,836
[45] Date of Patent: Sep. 22, 1998

[54] SHIFT DEVICE FOR A CHANGE SPEED GEARBOX

[75] Inventors: Reiner Pätzold, Stuttgart; Carsten Peuster, Esslingen, both of Germany

[73] Assignee: Mercedes-Benz AG, Stuttgart, Germany

[21] Appl. No.: 818,358

[22] Filed: Mar. 17, 1997

[30] Foreign Application Priority Data

Mar. 15, 1996 [DE] Germany .................. 196 10 104.2

[51] Int. Cl.$^6$ .................................................. F16H 59/02
[52] U.S. Cl. ................. 74/337.5; 74/473.25; 74/473.36; 74/483 R
[58] Field of Search .................... 74/335, 337.5, 74/473.36, 473.37, 483 R, 480 R, 473.21, 473.24, 473.25, 473.1

[56] References Cited

U.S. PATENT DOCUMENTS

| 4,344,334 | 8/1982 | Schmittbetz et al. | 74/473.21 |
| 4,449,416 | 5/1984 | Huitema | 74/473.37 X |
| 4,713,979 | 12/1987 | Muto et al. | |
| 5,309,785 | 5/1994 | Knape | 74/473.24 |
| 5,704,251 | 1/1998 | Alber et al. | 74/335 X |
| 5,704,252 | 1/1998 | Loeffler | 74/483 R X |

FOREIGN PATENT DOCUMENTS

| 0795701 | 9/1997 | European Pat. Off. |
| 2048909 | 4/1971 | Germany |
| 3012764 | 10/1981 | Germany |
| 3315221 | 10/1984 | Germany |
| 4137142 | 5/1993 | Germany |
| 4309027 | 9/1994 | Germany |
| 19530616 | 2/1997 | Germany |
| 1031400 | 6/1966 | United Kingdom |

OTHER PUBLICATIONS

"Doppelstück", Gebrauchsmuster., Schalt–und Verriegelungsvorrichtung für Geschwindigkeits–Wechselgetriebe, insbesondere für Kraftfahrzeuge, Jul. 30, 1956.

*Primary Examiner*—Charles A. Marmor
*Assistant Examiner*—Scott Lund
*Attorney, Agent, or Firm*—Evenson McKeown Edwards & Lenahan, PLLC

[57] ABSTRACT

In a shift device for a change speed gearbox, a shift shaft is kinematically connected to a selector sleeve which can be optionally braked tight, in such a way that when the selector sleeve is braked tight, axial movements of the shift shaft lead to superimposed rotational movements of the shift shaft, whereas when the selector sleeve is not braked, they lead to rotational movements of the selector sleeve.

27 Claims, 4 Drawing Sheets

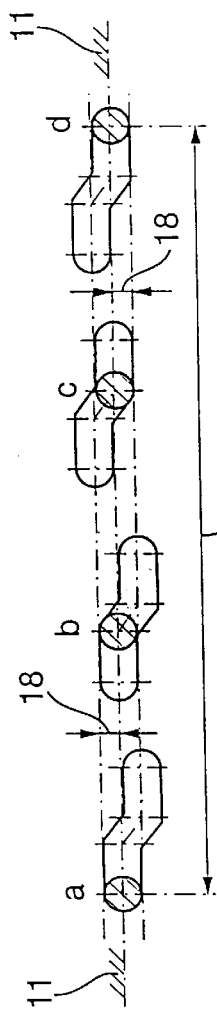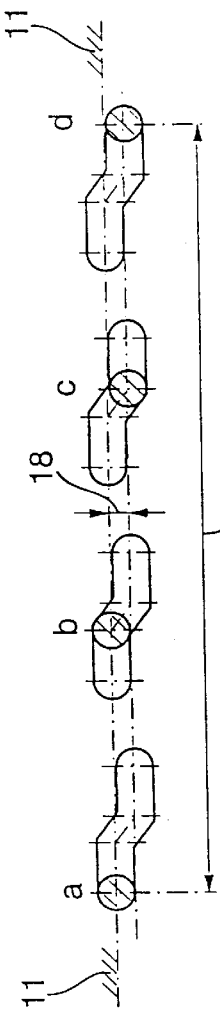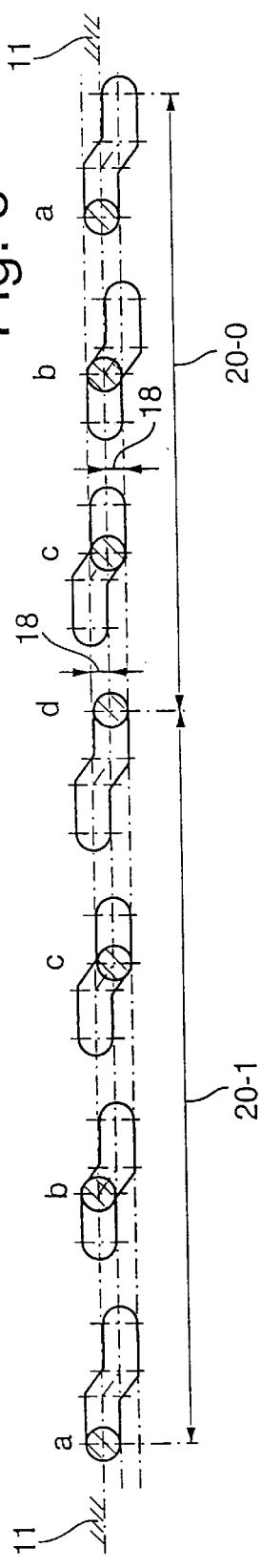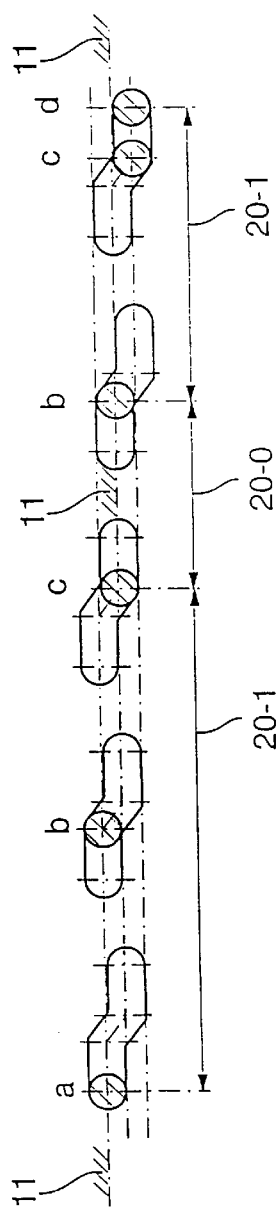

SHIFT DEVICE FOR A CHANGE SPEED GEARBOX

BACKGROUND AND SUMMARY OF THE INVENTION

This application claims the priority of German application No. 196 10 104.2 filed on Mar. 15, 1996, the disclosure of which is expressly incorporated by reference herein.

The invention relates to a shift device for a change speed gearbox having at least two gear wheel clutches for coupling in each case one associated gear wheel to its gearbox shaft.

In a known shift device of the type disclosed in German Patent Document (DE 41 37 142 A1), an electric servo-motor is used whose actuator element (motor shaft) which executes rotational actuation movements is connected fixedly in terms of movement to the selector sleeve and is connected to the shift shaft by means of an additional engageable and disengageable clutch, while the brake is connected to the shift shaft and has to be constructed with an appropriate degree of freedom for the axial movements of the latter. In this known shift device, it is considered essential that only one servo-motor is used and that this is of an electrical nature so that the torque can be easily controlled by means of the engine current. However, in this known shift device, the structural and control complexity is high as a result of the additional clutch, which inevitably has to be controlled in the opposite sense to the brake, i.e. if the clutch is open—in order to generate a translatory activation of the shift shaft for the gear shift—the brake must be engaged, or vice versa, if the clutch is engaged—in order to generate a rotational activation of the shift shaft to select the shift gates—the brake must be vented. Furthermore, in the case of this known shift device, the control expenditure is increased further as a result of the fact that the servo-motor has to be deactivated when the shift shaft reaches or departs from so that the clutch and brake can be adjusted.

In a known shift device of another type disclosed in German Patent Document DE 43 09 027 A1, an axial piston which is directly connected to the shift shaft and an axial piston which is connected to the shift shaft by means of an auxiliary mechanism for converting a reciprocatory movement into a rotational movement are accommodated in a common cylinder casing.

In a further device of another type described in commonly assigned U.S. application Ser. No. 08/700,855 filed Aug. 21, 1996, corresponding to German Patent Application 195 30. 616.3-14, it has already basically been made possible to skip one or more gears when changing gear, in which case, in order to activate the gear wheel clutches, an equal number of shift elements is arranged fixedly in terms of movement with respect to the shift shaft, specifically offset with respect to one another in each case in the circumferential and axial directions. Correspondingly, the selector sleeve is provided with a corresponding arrangement of window-like openings for coupling the respective shift element to the associated gear wheel clutch, the shift shaft and selector sleeve each having a motor-operated actuator element for their drive.

An object on which the present invention is based is essentially to reduce further the structural complexity in the case of a shift device of the type mentioned above, without losing the possibility of skipping gears when changing gear.

This object is advantageously achieved in accordance with preferred embodiments of the invention by providing a switch device, wherein the shift shaft is arranged fixedly in terms of movement in relation to the actuator element of the servo-motor which executes axial actuation movements, and the selector sleeve is connected to the brake, and wherein the auxiliary mechanism permits a relative rotation between the shift shaft and the selector sleeve by a difference angle of rotation corresponding to the distance between two adjacent significant angle of rotation positions of the shift shaft, when the shift shaft is in the region of its neutral position, wherein a latching device arranged in terms of action between the gearbox casing of the change speed gearbox and the shift shaft is used for the significant angle of rotation positions of the shift shaft and the arrangement is also effected in such a way that activation of the shift shaft out of a gear speed position into the neutral position in the engaged state of the brake inevitably leads to a rotation of the shift shaft in the one rotational sense, whereas in the disengaged state of the brake it inevitably leads to a rotation of the selector sleeve in the other rotational sense in relation to the gearbox casing or the change speed gearbox, in each case by the difference angle of rotation.

In the shift device according to the invention, the selector sleeve is derived from the drive of the shift shaft by mediation of the auxiliary mechanism and the brake of the selector sleeve providing the reaction necessary for this, so that a particular stepping motor is not necessary for the rotational drive of the selector sleeve.

Whereas in the case of the shift device which forms the generic type in the above mentioned commonly assigned patent application, the selector sleeve is additionally still used to lock the gear wheel clutches which are respectively not for this purpose, the same number of shift elements as gear wheel clutches are required on the shift shaft, in the shift device according to the present invention, a shift element of the shift shaft can be used to activate a plurality of gear wheel clutches because, here, the selector sleeve does not have a locking function.

In the case of the shift device according to preferred embodiments of the invention, a gear change in the same significant angle of rotation position of the shift shaft advantageously takes place by providing that the brake is held in the disengaged state when the shift shaft passes through the neutral position.

In the case of the shift device according to preferred embodiments of the invention, a gear change between two gear speeds located in adjacent significant angle of rotation positions are on each side of the neutral position of the shift shaft advantageously takes place by providing that when the shift shaft passes through the neutral position, the brake is held in the engaged state.

In the case of the shift device according to the preferred embodiments of the invention, for a gear change between two gear speeds located in adjacent significant angle of rotation positions but in the same sense with respect to the neutral position of the shift shaft the method in accordance with the immediately preceding paragraph may be adopted, which is then followed by a method step where the brake is held in the disengaged state when the shift shaft passes through the neutral position or vice versa.

In the case of the shift device according to the invention, a gear change between two gear speeds located in different, non-adjacent significant angle of rotation positions of the shift shaft advantageously takes place with the brake engaged when passing through the neutral position in one direction and with the brake disengaged when passing through the neutral position in the opposite direction. In the case of a gear change according to this method, in order to keep the control complexity low, the shift shaft in the case of the shift device according to the invention could be activated into the respective gear speed positions in each of the significant angle of rotation positions to be travelled through until the target gear speed is reached. However, using this method in the case of the shift device according to the invention for a gear change between two gear speeds located in different, non-adjacent significant angle of rotation positions of the shift shaft the shifting expenditure and, possibly, a synchronization expenditure for the engagement and disengagement of intermediate gears is advantageously avoided by means of a method wherein after the shift shaft has reached a significant angle of rotation position which does not include the selected gear speed position and after it has departed from the neutral position but before a gear speed position has been reached, the axial movement of the shift shaft is adjusted into the respective other axial direction.

In the case of the shift device according to the invention, a helical gear unit with a flat thread is used as an auxiliary mechanism for driving the selector sleeve, in which case it could be possible for the selector sleeve to be realized with the inner thread and the shift shaft to be realized with the outer thread.

Advantageous refinements of the auxiliary mechanism in the case of the shift device according to preferred embodiments of the invention utilize a slider guide in which simpler control of the brake than in the case of a pure helical gear unit is achieved under certain conditions.

Further particularly structurally advantageous refinements of the shifting device according to the invention include special latching provisions.

Other objects, advantages and novel features of the present invention will become apparent from the following detailed description of the invention when considered in conjunction with the accompanying drawings.

BRIEF DESCRIPTION OF THE DRAWINGS

FIG. 4 shows a graphic sequence of shift phases in the case of a first gear change;

FIG. 5 shows a graphic sequence of shift phases in the case of a second gear change;

FIG. 6 shows a graphic sequence of shift phases in the case of a third gear change; and FIG. 7 shows a graphic sequence of shift phases in the case of a fourth gear change.

DETAILED DESCRIPTION OF THE DRAWINGS

Figure 1:
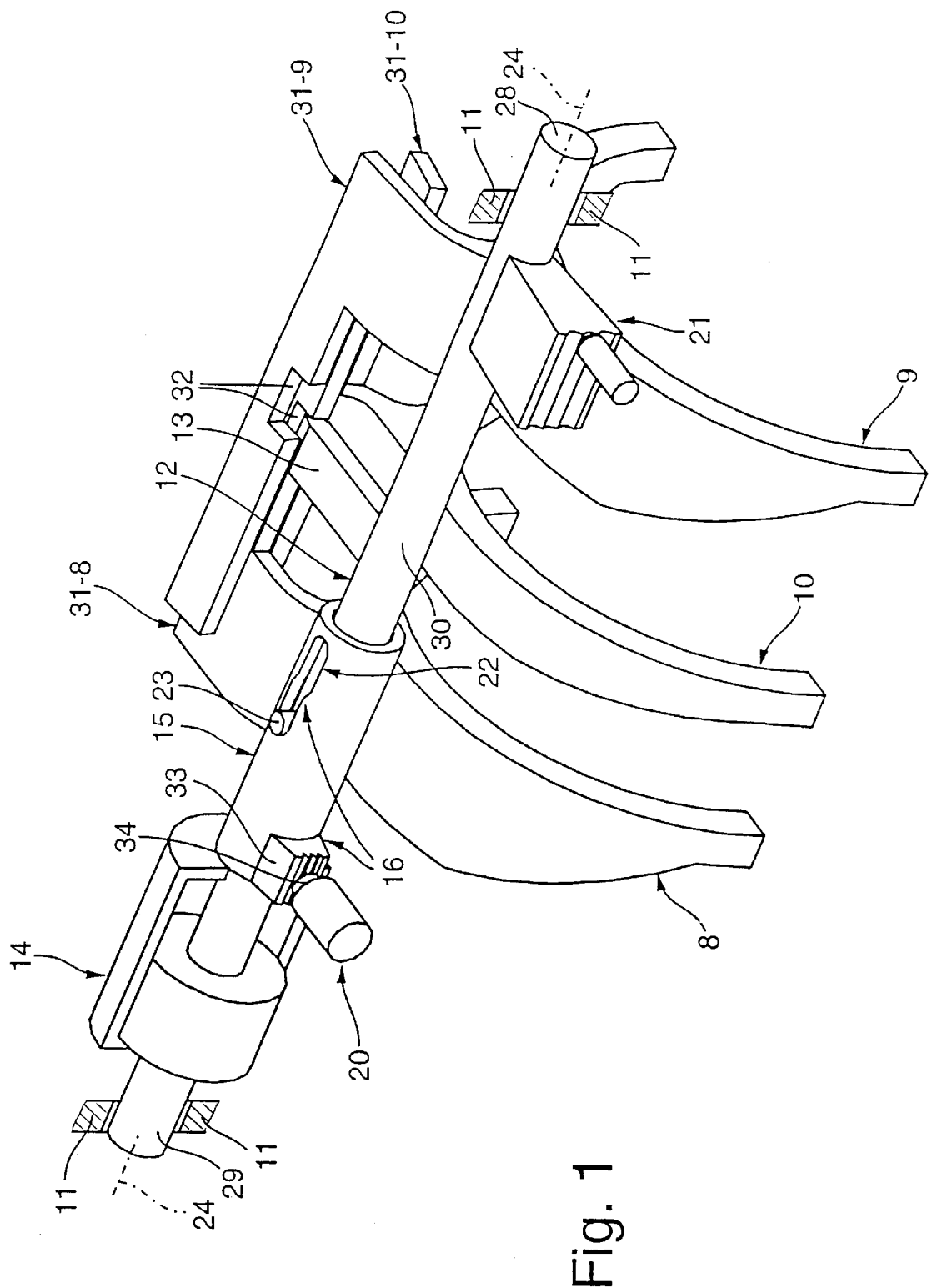
FIG. 1 is a perspective schematic view of a shift device constructed according to a preferred embodiment of the invention.

In a schematically indicated gearbox casing of a change speed gearbox (not illustrated in more detail), a shift shaft 12 which is aligned with its axis of rotation 24—24 parallel to the gearbox shafts is mounted rotatably and axially displaceably. In order to couple the loose wheels of the gear wheel stages, supplying the gearbox transmission ratios, to their gearbox shaft, gear wheel clutches, which are activated either individually or in pairs and optionally by means of shift forks 8, 9 and 10, are seated on the gearbox shafts. The shift forks 8, 9 and 10 each are connected in turn to an associated shift rail or rod 31-8, 31-9 and 31-10 fixedly in terms of movement. These shift rods are both mounted so as to be linearly movable in relation to the gearbox casing 11, in each case along a movement path parallel to the axis of rotation 24—24, and each provided with a clutch slot 32 for the engagement of a shift finger 13 which—is arranged radially and fixedly in terms of—movement with respect to the shift shaft 12. In this context, the arrangement is effected such that in that gearbox state in which all the gear wheel clutches are disengaged, the shift finger 13 and all the clutch slots 32 are in a neutral position, that is to say are located centrally with respect to a casing plane which is located perpendicularly on the axis of rotation 24—24.

The shift rods 31-8, 31-9 and 31-10 are fixed with their respective clutch slot 32 in relation to the gearbox casing 11 in each case in one associated angle of rotation position about the axis of rotation 24—24 of the shift shaft 12. The shift shaft 12 must accordingly be activated into a significant angle of rotation position 12-8 if the shift finger 13 is to be in engagement, in accordance with FIGS. 1 and 2, with the shift slot 32 of the shift rod 31-8. The shift shaft 12 must be activated into a significant angle of rotation position 12-9 if the shift finger 13 is to be moved into engagement with the shift slot 32 of the shift rod 31-9. And the shift shaft 12 must be activated into a significant angle of rotation position 12-10 if the shift finger 13 is to be in engagement with the shift slot 32 of the shift rod 31-10.

Each of the shift rods 31-8, 31-9 and 31-10 can be activated —starting from the neutral position—in the axial direction, pointing from the shift finger 13 to the one shaft end 29 of the shift shaft 12, into a gear speed position a or in the opposite axial direction into a gear speed position d.

In order to activate the shift shaft 12 into its two end positions associated with the gear speed positions a and d, the shift shaft 12 is coupled at its shaft end 29 to a shift actuator element 14 of the axial piston type.

In order to activate the shift shaft 12 into its significant angle of rotation positions 12-8, 12-9 and 12-10, a selector sleeve 15 is used which is connected to the shift shaft 12, with the mediation of an auxiliary mechanism 16, in order to convert a reciprocatory movement into a rotational movement, the gearbox reaction being mediated by an engageable and disengageable brake and the selector sleeve 15 likewise being driven by the shift actuator element 14.

While the shift finger 13 is arranged at a central section 30 of the shift shaft 12, the other end 28 of the shift shaft 12 is connected to a latching device 21 by means of which the shift shaft 12 is latched in its significant angle of rotation positions 12-8, 12-9 and 12-10 in relation to the gearbox casing 11.

The selector sleeve 15 is arranged so as to be rotatable and axially undisplaceable in relation to the gearbox casing 11, in a manner which is no longer illustrated.

The selector sleeve 15 is arranged on the section of the shift shaft 12 located between the shift finger 13 and shift actuator element 14, concentrically and in fact both rotationally movably and axially movably relative to the shift shaft 12.

The brake 20 is arranged in a positively locking fashion at that sleeve end of the selector sleeve 15 which faces the shift actuator element 14, the selector sleeve 15 having here a latching segment 33 which is fixed in terms of movement with respect to it and is provided with in each case one latching means for the angle of rotation positions of the selector sleeve 15 in relation to the gearbox casing 11, a brake engagement element 34 being able to engage in a positively locking fashion into the latching means, being capable of being activated by motor and being arranged radially movably with respect to the axis of rotation 24—24.

A slider 22, arranged fixedly in terms of movement with respect to the selector sleeve 15, with a slider block or pin 23 arranged radially and fixedly in terms of movement with respect to the shift shaft 12 is used for the auxiliary mechanism 16.

The slider 22 has two slider sections 25 and 26 which run parallel to the axis of rotation 24—24 of the shift shaft 12 and are offset in the circumferential direction with respect to one another, specifically by an offset 18 (FIG. 3 (*b*)) which corresponds to the difference angle of rotation 17 (FIG. 2) by which the adjacent significant angle of rotation positions 12-8 and 12-9 as well as 12-8 and 12-10 of the shift shaft 12 are offset in relation to one another.

Assigned to the slider ends 25-1 and 26-1 of the slider sections 25 and 26 located opposite one another is in each case a position a (FIG. 3 (*a*)) and d (FIG. 3 (*d*)) of the slider pin 23, which position corresponds to the respective end position of the shift shaft 12 and thus to the gear speed positions a and d of the shift rods 31-8, 31-9 and 31-10.

At the slider ends 25-2 and 26-2 facing one another, the slider sections 25 and 26 are connected to one another by means of a central slider section 27 which extends at an incline with respect to the axis of rotation 24—24 of the shift shaft 12 and in a manner determined by the offset 18. The central section 27 of the slider 22 is assigned to the neutral position N (FIG. 3 (N)) of the slider pin 23 and thus to the neutral position of the shift shaft 12.

The slider ends 25-1 and 26-1, facing one another, of the slider sections 25 and 26 enclose between them the region 19 (FIG. 3 (*b*) and (*c*)) of the neutral position N which is highly significant for the control of the shift shaft 12 by the brake 20. The position of the slider pin 23 at the junction 25-2 between the slider sections 25 and 27 is indicated by b (FIG. 3 (*b*)). The position of the slider pin 23 at the junction 26-2 between the slider sections 26 and 27 is indicated by c (FIG. 3 (*c*)).

Figure 2:
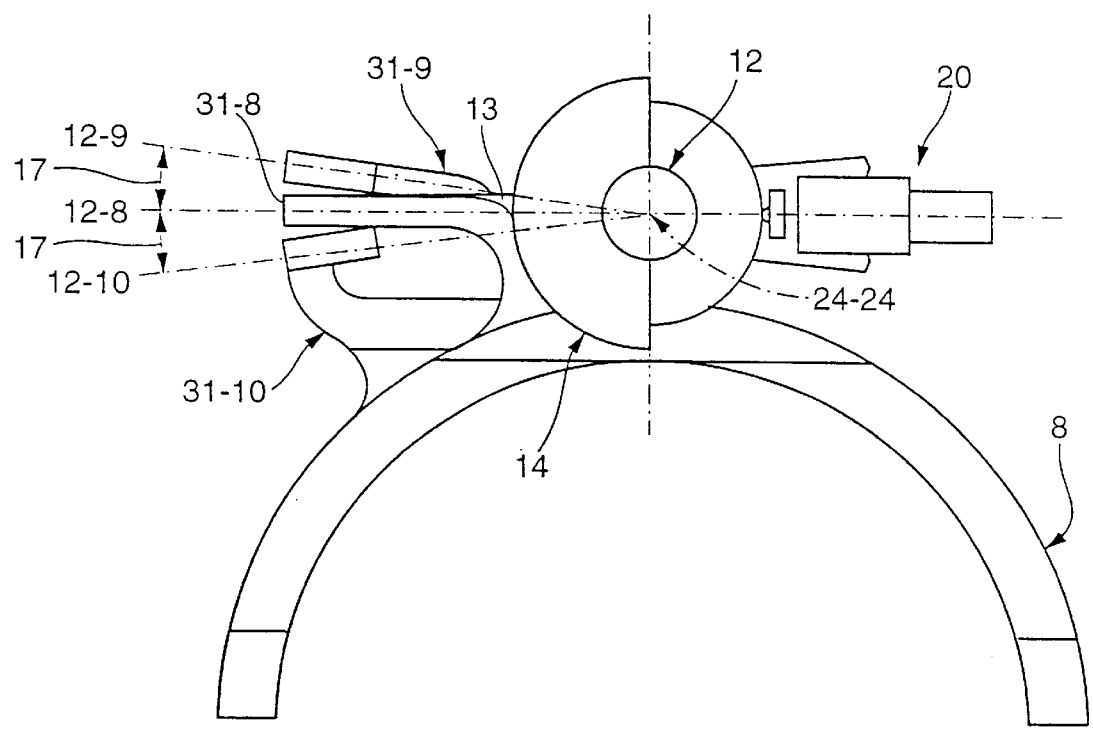
FIG. 2 shows the shift device from FIG. 1 in a view seen in the direction of the axis of rotation of the shift shaft.
Figure 3A:
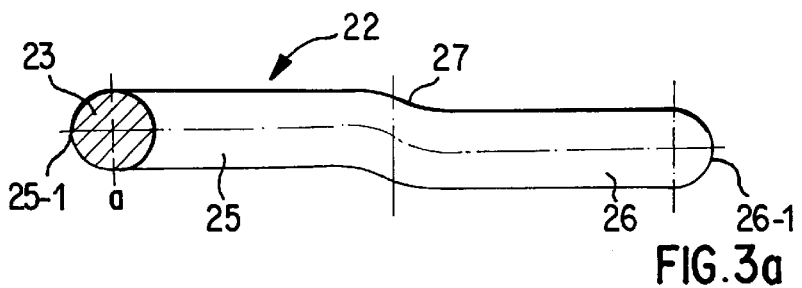
FIG. 3(a) through FIG. 3(d) graphically illustrate the interaction of the shift shaft and selector sleeve device from FIG. 1 during a gear change.
Figure 3B:
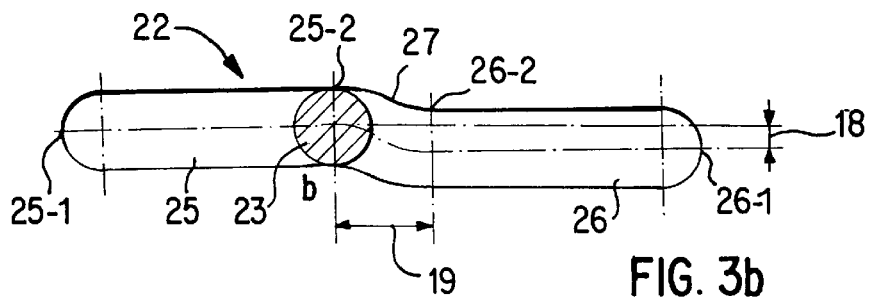
Figure 3N:
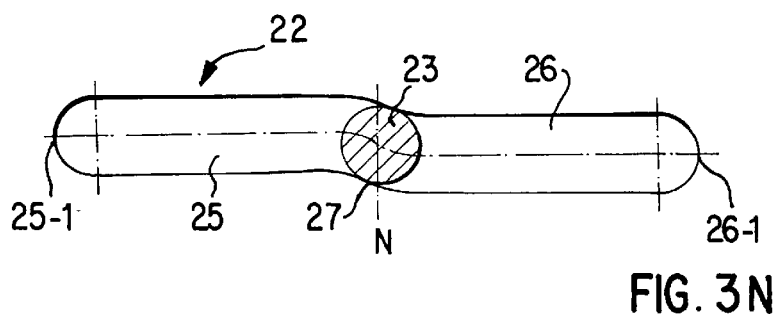
Figure 3C:
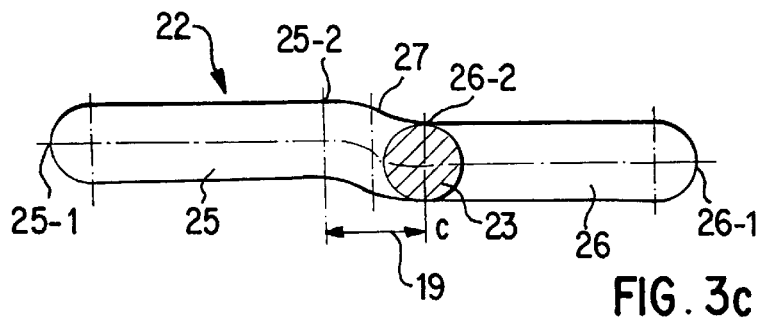
Figure 3D:
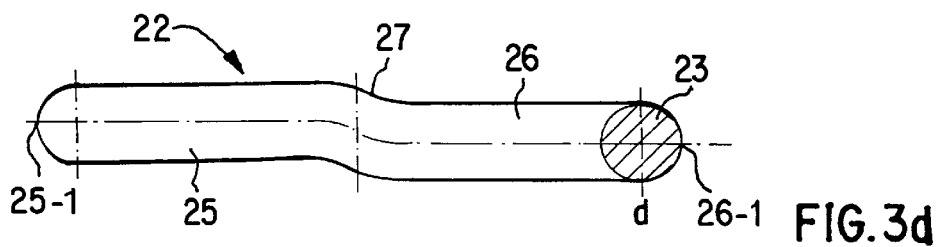

The method of operation of the shift device according to the invention is as follows:

In FIGS. 1 and 2, the shift device is shown in a state in which the shift rod 31-8 is in the gear speed position a and the shift rod 12 is in the corresponding end position (position a of the slider pin 23) as well as in the significant angle of rotation position 12-8 for the engagement of the shift finger 13 into the shift slot 32 of the shift rod 31-8.

In the case of a gear change out of the gear speed position a of the shift rod 31-8 into the selected gear speed with the same gate (gear speed position d of the shift rod 31-8), in accordance with the FIG. 4 the brake 20 is kept in the disengaged state 20-0 and the shift shaft 12 is kept in the significant angle of rotation position 12-8 by means of the latching device 21. The shift shaft 12 is activated by the shift actuator element 14 into the end position corresponding to the gear speed position d, the reactionless selector sleeve 15 being rotated, as it passes through the region 19, in relation to the shift shaft 12 by the slider pin 23 by the offset 18 in the sense of rotation pointing from the shift rod 31-8 to the shift rod 31-10 - defined below as clockwise.

In the case of a gear change out of the gear speed position a of the shift rod 31-8 into the gear speed position d of the adjacent shift rod 31-9, the brake 20 is kept, in accordance with FIG. 5, in the engaged state 20-1 and the shift shaft 12 is activated by the shift actuator element 14 into the end position associated with the gear speed position d, a rotational movement by the difference angle of rotation 17 into the significant angle of rotation position 12-9 being imposed on the shift shaft 12 by the slider section 27 as-the said shift shaft 12 passes through the region 19 of the neutral position N, the sense of rotation of the said angle of rotation position 12-9 being opposed to the sense of rotation of the selector sleeve 19 in the case of the previously described gear change with disengaged brake 20.

In the case of a gear change out of the gear speed position a of the shift rod 31-8 into the gear speed position a of the shift rod 31-9, the shift shaft 12 is initially activated, in accordance with FIG. 6 as described above, into the gear speed position d of the shift rod 31-9 in the engaged state 20-1 of the brake 20, a further opposed activation of the shift shaft 12 in accordance with FIG. 6 following in such a way that the brake 20 is held in the disengaged state 20-0 when the shift shaft 12 is moved into the end position corresponding to the gear speed position a.

In the case of a gear change out of the gear speed position a of the shift rod 31-8 into the gear speed position d of the shift rod 31-10, the shift shaft 12 is initially activated when brake 20 is disengaged, in accordance with FIG. 4, into the end position corresponding to the gear speed position d, as a result of which the reactionless selector sleeve 15 is rotated clockwise by the difference angle of rotation 17 in relation to the shift shaft. This is then followed by an opposed activation of the shift shaft 12 in accordance with FIG. 6 into the other end position in the engaged state 20-1 of the brake 20, so that a rotational clockwise movement by the difference angle of rotation 17 into the significant angle of rotation position 12-10 is imposed on the shift shaft 12 for the engagement of the shift finger 13 into the clutch slot 32 of the shift rod 31-10. Finally, an opposed activation of the shift shaft 12 when brake 20 is disengaged into the end position corresponding to the gear speed position d takes place.

In the case of the gear change described last, it has been found in particular that the desired sense of rotation of the shift shaft 12 can be brought about by determining the operational state of the brake 20 before the neutral position is first passed through after the start of the gear change.

A particular advantage of the slider guide 22–23 in comparison with a pure helical gearbox is clearly that, as a result of the fact that the slider sections 25, 26 extend in parallel, the control of the brake 20 does not have to be matched precisely to the junctions 25-2 and 26-2 with the inclined part of the extent of the slider section 27 of the neutral position N, but rather the state of the brake 20 which is necessary for the gear change can already be brought about when the old gear speed is still engaged.

Whereas in the case of the gear change described last it was necessary for the shift shaft 12 to pass through the neutral position N repeatedly whenever the operating state of the brake 20 changed and the shift shaft-12 was activated each time into its respective end position (position a or d of the slider pin 23), in the case of the gear change according to FIG. 7 there is indeed likewise provision for the shift shaft 12 to pass through the neutral position N repeatedly with corresponding adjustment of the brake 20, in order for example to pass from a first significant angle of rotation position into a non-adjacent second significant angle of rotation position, but this does not include an activation of the shift shaft 12 into its end positions until the significant angle of rotation position of the target gear speed has been reached.

This will now be explained with reference to a gear change out of the gear speed position a of the shift rod 31-10 into the gear speed position d of the shift rod 31-9

The shift rod 31-9 is offset anticlockwise 1n relation to the shift rod 31-10, so that, in accordance with FIG. 7, the brake 20 is engaged at the start of the gear change (switching on the shift actuator element 14) and an anticlockwise rotational movement to the amount of the difference angle of rotation 17 into the adjacent significant angle of rotation position 12-8 is imposed on the shift shaft 12 as it passes through the neutral position N from b to c.

When the shift shaft 12 reaches the position c, the brake 20 is disengaged and the shift actuator element 14 is adjusted so that the shift shaft 12 passes through the region 19 of the neutral position N from c to b—that is to say just before it reaches the gear speed position d of the significant angle of rotation position 12-8—as a result of which an anticlockwise rotational movement by the offset 18—that is to say to an amount corresponding to the difference angle of rotation 17—is imposed on the selector sleeve 15 which is reactionless in this context, so that the slider section 26 assumes its position corresponding to the significant angle rotation position 31-9.

If the shift shaft 12 now reaches the position b after passing through the neutral position N, the brake 20 is moved into the engaged state 20-1 and the shift actuator element 14 is adjusted so that an anticlockwise rotational movement by the difference angle of rotation 17 into the significant angle of rotation position 12-9 is imposed on the shift shaft 12 by the slider section 27 during the activation in the direction of the end position corresponding to the gear speed position d, and the shift rod 31-9 is thus activated by the shift finger 13 into its gear speed position d corresponding to the aimed-at target gear speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Shift device for a change speed gearbox, having at least two gear wheel clutches for coupling in each case one associated gear wheel to its gearbox shaft, having a shift shaft which is rotatably and axially movably mounted relative to a gearbox casing, having at least one shift element, arranged fixedly in terms of movement with respect to the shift shaft, for activating the gear wheel clutches with axial movements of the shift shaft, having a neutral position of the shift shaft in relation to its axial movements, the neutral position corresponding to a disengaged state of all the gear wheel clutches, having significant angle of rotation positions of the shift shaft, in which in each case at least one associated gear wheel clutch can be activated by the shift element, having a gear speed position of the shift shaft corresponding to an engaged state of one of the gear wheel clutches associated with the respective significant angle of rotation position, having a servo-motor for moving the shift shaft in a first axial direction and a second axial direction, having a selector sleeve, which is used for activating the shift shaft into the significant angle of rotation positions and is arranged concentrically and axially movably relative to the shift shaft, and rotatably movably and axially fixedly in terms of movement relative to the gearbox casing, and in which device the shift shaft and the selector sleeve are connected to one another by means of an auxiliary mechanism for converting a reciprocatory movement into a rotational movement and the auxiliary mechanism has a brake which can be in an engaged state and a disengaged state and which is connected in terms of action to one of the gearbox casing and the change speed gearbox, characterized in that the shift shaft is arranged fixedly in terms of movement in relation to an actuator element of the servo-motor which executes axial actuation movements, and the selector sleeve is connected to the brake, and in that the auxiliary mechanism permits a relative rotation between the shift shaft and the selector sleeve by a difference angle of rotation corresponding to the distance between two adjacent significant angle of rotation positions of the shift shaft, when the shift shaft is in the region of its neutral position, in that a latching device arranged in terms of action between the gearbox casing of the change speed gearbox and the shift shaft is used for the significant angle of rotation positions of the shift shaft and the arrangement is also effected in such a way that activation of the shift shaft out of the gear speed position into the neutral position in the engaged state of the brake leads to a rotation of the shift shaft in a first rotational sense, whereas in the disengaged state of the brake it leads to a rotation of the selector sleeve in a second rotational sense in relation to the gearbox casing or the change speed gearbox, in each case by the difference angle of rotation.

2. Shift device according to claim 1, comprising means for controlling the shift shaft for changing between two gear speed positions located in a common significant angle of rotation position and on each side of the neutral position, such that when the shift shaft passes through the neutral position, the brake is held in the disengaged state.

3. Shift device according to claim 1, comprising means for controlling the shift shaft for changing between two gear speed positions located in adjacent significant angle of rotation positions and on each side of the neutral position, such that when the shift shaft passes through the neutral position, the brake is held in the engaged state.

4. Shift device according to claim 1, comprising means for controlling the shift shaft for changing between two gear speed positions located in various non-adjacent significant angle of rotation positions, such that the shift shaft passes through the neutral position alternately in the first and second axial directions, and as it passes through in the first axial direction the brake is held in the engaged state and as it passes through in the second axial direction the brake is held in the disengaged state.

5. Shift device according to claim 4, comprising means for controlling the shift shaft for changing between an instantaneous gear speed position and a selected gear speed position, such that after the shift shaft has reached the significant angle of rotation position which does not include the selected gear speed position and after it has departed from the neutral position but before the selected gear speed position has been reached, the axial movement of the shift shaft is adjusted into the second axial direction.

6. Shift device according to claim 1, wherein a slider with a corresponding slider block is used for the auxiliary mechanism.

7. Shift device according to claim 6, wherein the slider has two slider sections, located offset with respect to one another both in the directions of the axis of rotation of the shift shaft and by the difference angle of rotation, and extending parallel to the axis of rotation.

8. Shift device according to claim 7, wherein each of the two slider sections have slider ends, and of the slider ends of the slider sections which are located opposite one another, at least one of the slider ends is assigned to the gear speed position of the shift shaft.

9. Shift device according to claim 7, wherein the slider has a central slider section intermediate said two slider sections which extends at an incline with respect to the axis of rotation of the shift shaft, and the central slider section is assigned to the neutral position of the shift shaft.

10. Shift device according to claim 9, wherein the triggering of a control signal for adjusting the shift shaft into an axial direction pointing to one of said two slider sections assigned to the gear speed position is provided at a junction between the central slider section assigned to the neutral position and the slider section assigned by its slider end to the gear speed position.

11. Shift device according to claim 6, wherein the slider is arranged fixedly in terms of movement with respect to the selector sleeve.

12. Shift device according to claim 1, wherein a first shaft end of the shift shaft is connected to the latching device and a second shaft end of the shift shaft is connected to the actuator element, wherein the shift element is arranged at a central shaft section of the shift shaft and the selector sleeve is arranged at a shaft section of the shift shaft located between the actuator element and the shift element, and wherein the brake is arranged at a sleeve end of the selector sleeve facing the actuator element.

13. Shift device according to claim 1, wherein the gear wheel clutches are activated by means of shift rods which are arranged both parallel to the shift shaft rotation axis and in the same axial region relative to the shift shaft rotation axis and axially movably relative to the gearbox casing and each have a clutch slot for the engagement of a shift finger which is used as the shift element.

14. Shift device according to claim 1, wherein the brake is positively engaging and the selector sleeve has a latching segment with latching means, assigned to the significant angle of the shift rotation positions of the shift shaft, for the engagement of a brake engagement element which can move radially with respect to the axis of rotation of the shift shaft.

15. A shifting assembly for a change speed transmission of the type having a plurality of gear wheel clutches for selectively coupling respective gear wheels with a gearbox shaft, comprising:

a shift shaft supported in a gearbox for axial and rotatable movement and carrying a shift element which is selectively engageable with a plurality of clutch actuation members to activate respective ones of said clutches in dependence on the rotative and axial position of the shift shaft, a shift shaft actuator operable to axially move the shift shaft, a selector sleeve concentric with the shift shaft, said selector sleeve being axially fixed with respect to the gearbox and rotatable with respect to the shift shaft, a selectively actuable brake for rotatably braking the selector sleeve with respect to the gearbox, and a selectively actuable latch for selectively rotatably latching the shift shaft with respect to the gearbox, wherein said shift shaft and said selector sleeve include mutually abutting entrainment parts which control movement of said shift shaft and said shift element through predetermined shifting patterns of said clutch actuation members in response to axial movement of the shift shaft coupled with control of respective ones of said brake and said latch.

16. A shifting assembly according to claim 15, wherein said mutually abutting entrainment parts are configured to rotatably move the shift shaft between different angular rotative positions corresponding to engagement positions of the shift element and respective ones of said clutch actuation members.

17. A shifting assembly according to claim 16, wherein said mutually abutting entrainment parts include a pin carried by one of the shift shaft and the selector sleeve and a slot in the other of said shift shaft and said selector sleeve.

18. A shifting assembly according to claim 17, wherein said plurality of clutch actuation members are disposed with engagement openings for said shift element disposed to operably engage the shift element at said different angular rotative positions of the shift shaft such that the shift element is selectively movable between positions engaging one of said clutch actuation members and intermediate neutral positions out of engagement with said clutch actuation members.

19. A shifting assembly according to claim 16, wherein said plurality of clutch actuation members are disposed with engagement openings for said shift element disposed to operably engage the shift element at said different angular rotative positions of the shift shaft such that the shift element is selectively movable between positions engaging one of said clutch actuation members and intermediate neutral positions out of engagement with said clutch actuation members.

20. A shifting assembly according to claim 16, wherein said entrainment part of said shift shaft is a radially extending pin on said shift shaft and said entrainment part of said selector sleeve is a radially open slot in said selector sleeve.

21. A shifting assembly according to claim 20, wherein said slot includes axially extending slot sections joined together by an inclined position.

22. A shifting assembly according to claim 21, wherein said inclined position corresponds to a neutral rotative shift position of said shift shaft.

23. A method of operating a shifting assembly for a change speed transmission of the type having a plurality of gear wheel clutches for selectively coupling respective gear wheels with a gearbox shaft, said shifting assembly comprising:

a shift shaft supported in a gearbox for axial and rotatable movement and carrying a shift element which is selectively engageable with a plurality of clutch actuation members to activate respective ones of said clutches in dependence on the rotative and axial position of the shift shaft, a shift shaft actuator operable to axially move the shift shaft, a selector sleeve concentric with the shift shaft, said selector sleeve being axially fixed with respect to the gearbox and rotatable with respect to the shift shaft, a selectively actuable brake for rotatably braking the selector sleeve with respect to the gearbox, and a selectively actuable latch for selectively rotatably latching the shift shaft with respect to the gearbox, wherein said shift shaft and said selector sleeve include mutually abutting entrainment parts which control movement of said shift shaft and shift element through predetermined shifting patterns of said clutch actuation member in response to axial movement of the shift shaft coupled with control of respective ones of said brake and said latch, wherein said mutually abutting entrainment parts are configured to rotatably move the shift shaft between different angular rotative positions corresponding to engagement positions of the shift element and respective ones of said clutch actuation members, and wherein said plurality of clutch actuation members are disposed with engagement openings for said shift element disposed to operably engage the shift element at said different angular rotative positions of the shift shaft such that the shift element is selectively movable between positions engaging one of said clutch actuation members and intermediate neutral positions out of engagement with said clutch actuation members, said method comprising controlling the shift shaft between respective different gear speed positions by axially moving the shift shaft and controlling the rotational angular position of the shift shaft by controlling engaging of the brake and the latch.

24. A method according to claim 23, wherein said controlling the shift shaft includes controlling the shift shaft for changing between two gear speed positions located in a common significant angle of rotation position and on each side of a neutral position, such that when the shift shaft passes through the neutral position, the brake is held in a disengaged state.

25. A method according to claim 23, wherein said controlling the shift shaft includes controlling the shift shaft for changing between two gear speed positions located in adjacent significant angle of rotation positions and on each side of a neutral position, such that when the shift shaft passes through the neutral position, the brake is held in an engaged state.

26. A method according to claim 23, wherein said controlling the shift shaft includes controlling the shift shaft for changing between two gear speed positions located in various non-adjacent significant angle of rotation positions, such that the shift shaft passes through a neutral position alternately in a first axial direction and a second axial direction, and as it passes through in the first axial direction the brake is held in an engaged state and as it passes through in the second axial direction the brake is held in a disengaged state.

27. A method according to claim 26, wherein said controlling the shift shaft includes controlling the shift shaft for changing between an instantaneous gear speed position and a selected gear speed position, such that after the shift shaft has reached a significant angle of rotation position which does not include the selected gear speed position and after it has departed from the neutral position but before the selected gear speed position has been reached, the axial movement of the shift shaft is adjusted into the second axial direction.

* * * * *